United States Patent
Peddireddy et al.

(10) Patent No.: US 8,611,889 B2
(45) Date of Patent: Dec. 17, 2013

(54) REMOTE HANDSET DIAGNOSTICS

(75) Inventors: Sudheer Kumar Peddireddy, Garland, TX (US); Vani Budhati, Garland, TX (US); Guoxin Fan, Plano, TX (US); Sundararajan Chellappan, Garland, TX (US); Rohit Kothari, Garland, TX (US); Gary Bernitz, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1516 days.

(21) Appl. No.: 11/535,283

(22) Filed: Sep. 26, 2006

(65) Prior Publication Data

US 2008/0084992 A1    Apr. 10, 2008

(51) Int. Cl.
*H04W 24/00*    (2009.01)
*H04M 3/00*    (2006.01)

(52) U.S. Cl.
USPC .......................................... 455/424; 455/419

(58) Field of Classification Search
USPC .................. 455/418, 419, 420, 423, 424, 425
See application file for complete search history.

(56) References Cited

U.S. PATENT DOCUMENTS

| 7,047,004 | B1* | 5/2006 | Tolbert, II | 455/425 |
|---|---|---|---|---|
| 7,200,390 | B1* | 4/2007 | Henager et al. | 455/419 |
| 7,369,846 | B2* | 5/2008 | Koivukangas et al. | 455/425 |
| 7,561,877 | B2* | 7/2009 | Cassett et al. | 455/423 |
| 7,809,365 | B2* | 10/2010 | Oommen | 455/419 |
| 8,116,759 | B2* | 2/2012 | Ying | 455/423 |
| 2001/0049263 | A1* | 12/2001 | Zhang | 455/67.1 |
| 2002/0072359 | A1* | 6/2002 | Moles et al. | 455/425 |
| 2003/0032408 | A1 | 2/2003 | Jennings | |
| 2003/0064719 | A1* | 4/2003 | Horne | 455/423 |
| 2004/0058651 | A1* | 3/2004 | Ross et al. | 455/67.11 |
| 2004/0087303 | A1* | 5/2004 | Pugliese | 455/423 |
| 2004/0137892 | A1* | 7/2004 | Hanood | 455/418 |
| 2004/0203467 | A1* | 10/2004 | Liu et al. | 455/67.14 |
| 2006/0217113 | A1* | 9/2006 | Rao et al. | 455/422.1 |
| 2006/0234698 | A1* | 10/2006 | Fok et al. | 455/425 |
| 2006/0264178 | A1* | 11/2006 | Noble et al. | 455/67.11 |
| 2008/0076401 | A1* | 3/2008 | Zeilingold et al. | 455/418 |

FOREIGN PATENT DOCUMENTS

| CN | 1402580 A | 3/2003 |
|---|---|---|
| EP | 1441491 A1 | 7/2004 |
| EP | 1 603 286 A1 | 12/2005 |
| GB | 2 364 802 A | 2/2002 |
| GB | 2378852 | 2/2003 |
| WO | 0067507 | 11/2000 |
| WO | WO 03/079660 A1 | 9/2003 |
| WO | WO 2005/076649 A1 | 8/2005 |

OTHER PUBLICATIONS

Patent application entitled "Handset Self Diagnostics," filed Sep. 26, 2006, as U.S. Appl. No. 11/535,293.

(Continued)

*Primary Examiner* — Christopher M Brandt (57) ABSTRACT

A system for remote handset diagnostics is provided. The system includes a plurality of handsets each having a diagnostic engine, and a carrier system having a plurality of encoder/decoder components. Each encoder/decoder component is operable to promote communication with at least one diagnostic engine to obtain diagnostic data. The carrier system further includes a diagnostic component that is operable to provide a common interface for diagnosing handsets. The diagnostic component is also operable to communicate with the plurality of encoder/decoder components and to facilitate diagnosis of the handset.

20 Claims, 5 Drawing Sheets

(56) References Cited

OTHER PUBLICATIONS

European Search Report; Application No. EP 07117143; Date of Search—Jan. 24, 2008; 7 pgs.

European Search Report dated Nov. 20, 2007 in connection with European Patent Application No. EP 07 11 3204.
Office Action dated Aug. 3, 2010 in connection with Chinese Patent Application No. 2007101617935.

* cited by examiner

Fig. 1

Provide a plurality of handsets each having diagnostic engines. 202

Provide a plurality of encoders and decoders, each encoder and decoder operable to promote communication with at least one handset diagnostic engine. 204

Provide a carrier system with a diagnostic component operable to communicate with each of the plurality of encoders and decoders and to facilitate communication with the handsets and diagnostic engines on the handsets. 206

Provide a manufacturer system operable to communicate with at least one of the handsets. 208

Requesting assistance with a handset. 210

The carrier system remotely assisting with the handset. 212

The manufacturer system remotely assisting with the handset. 214

REMOTE HANDSET DIAGNOSTICS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A handset may refer to a mobile phone, a wireless handset or telephone, a pager, a personal digital assistant, a portable computer, a tablet computer, or a laptop computer. When a user of the handset needs assistance in operating a handset, the user may contact a customer service center for a telecommunications network carrier. The customer service center may only provide certain assistance to the user, which may be limited when the handset is not physically present at the customer service center. If the customer service center cannot remedy the problem with the handset, the customer service center may send the handset to the handset manufacturer, and may charge the handset manufacturer for the return. Also, customer satisfaction may decrease when the handset is at the customer service center or at the handset manufacturer. Servicing the handset at the customer service center or at the handset manufacturer may create expenses for the network carrier, the handset manufacturer, or both.

SUMMARY

In one embodiment, a system for remote handset diagnostics is provided. The system includes a plurality of handsets each having a diagnostic engine, and a carrier system having a plurality of encoder/decoder components. Each encoder/decoder component is operable to promote communication with at least one diagnostic engine to obtain diagnostic data. The carrier system further includes a diagnostic component that is operable to provide a common interface for diagnosing handsets. The diagnostic component is also operable to communicate with the plurality of encoder/decoder components and to facilitate diagnosis of the handset.

In another embodiment, a method for remote handset diagnostics is provided. The method includes remotely obtaining first diagnostic data from a handset diagnostic engine by a carrier diagnostic computer. The method includes assisting a user of the handset to operate the handset, based on the first diagnostic data obtained from the handset. The method provides for remotely obtaining second diagnostic data from the handset diagnostic engine by a manufacturer diagnostic computer. The method also provides for assisting the user of the handset to operate the handset, based on the second diagnostic data obtained from the handset.

In yet another embodiment, a system for remote handset diagnostics is provided. The system includes a plurality of handsets, at least some of the handsets are provided by different manufacturers. A handset diagnostic engine corresponding to each handset is also provided. At least some of the different manufacturers having different handset diagnostic engines. The system also includes a telecommunications carrier system and a manufacturer system. The telecommunications carrier system includes a carrier diagnostic component for each of the plurality of different handset diagnostic engines. Each of the carrier diagnostic components is operable to obtain first diagnostic data from the corresponding handset diagnostic engine. The manufacturer system includes a manufacturer diagnostic component for each of the plurality of different handset diagnostic engines manufactured by the manufacturer. Each of the manufacturer diagnostic components is operable to obtain second diagnostic data from the corresponding handset diagnostic engine.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. This application includes subject matter related to U.S. patent application Ser. No. 11/535,293, filed Sep. 26, 2006, entitled "Handset Self Diagnostics," by Sudheer Kumar Peddireddy, et al. which is hereby incorporated by reference for all purposes.

When a handset user informs a customer service center, such as of a telecommunications provider, about a handset problem, embodiments of the present disclosure enable the customer service center to use a diagnostic computer to remotely communicate with a diagnostic engine on the handset. The diagnostic engine may obtain diagnostic data to correct the handset problem, even when the handset is not physically present at the customer service center. In some embodiments of the present disclosure, a diagnostic computer includes diagnostic capabilities for obtaining diagnostic data for different types of handsets and for assisting users to operate each different type of handset. By increasing the diagnostic capabilities of the customer service center, embodiments of the present disclosure promote resolving more problems, which in-turn increases customer satisfaction for handset users. Embodiments of the present disclosure may also reduce the expenses for handling service issues and reduce the need to service a handset at a customer service center and/or at the handset manufacturer.

Figure 1:
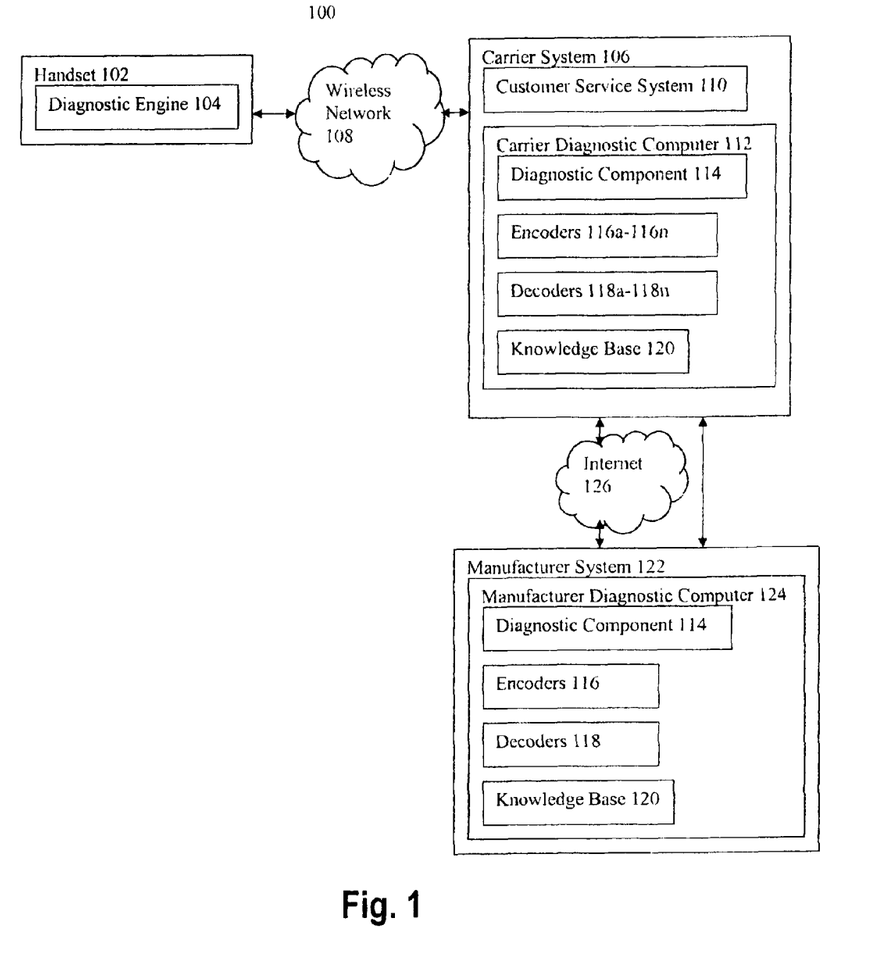
FIG. 1 shows a remote handset diagnostics system according to an embodiment of the present disclosure.

FIG. 1 depicts a remote handset diagnostics system 100 according to an embodiment of the present disclosure. The system 100 includes a handset 102, which includes a diagnostic engine 104. The handset 102 is described in more detail below with reference to FIGS. 3-5. The diagnostic engine 104 may generate or record information related to the operation of the handset 102. The system 100 shows only one handset for the purpose of an illustrative example, but the system 100 may include any number of handsets each having the same or different diagnostic engines.

The handset 102 may communicate with a carrier system 106 through a wireless network 108, such as the carrier's telecommunications network. The carrier system 106 may include a customer service system 110 and a diagnostic computer 112. The carrier's diagnostic computer 112 may be a separate or integrated system for communicating with the diagnostic engine 104 and assisting a user to operate the handset 102. A user of the handset 102 communicates with the customer service system 106 to obtain assistance with the handset 102. The customer service system 106 may use the diagnostic computer 112 to diagnose the handset 102 to assist the user to operate the handset 102.

The diagnostic computer 112 includes a diagnostic component 114, an encoder 116, a decoder 118, and a knowledge base 120. The diagnostic component 114 may be a software application or tool that promotes or allows the customer service representative to interface with the diagnostic engine 104 on the handset 102. It should be understood that handset manufacturers generally develop proprietary systems for their handsets. This may allow the manufacturer to develop more efficient systems with greater functionality.

Accordingly, each different handset typically has a different proprietary diagnostic engine 104. The diagnostic engine 104 may access handset 102 systems and generate or record diagnostic data that is proprietary and specific to the handset or handsets of the manufacturer. Diagnostic data is information related to the operation of the handset 102, and may include, but is not limited to, error logs, records of problems, dropped calls information, handset system parameters, success cases, configuration values, CPU/processor usage and activity, other handset systems information, and information other than commonly accessible handset settings, which tend to be more readily accessible to users. The user of the handset 102 typically could not directly access this diagnostic engine 104 or related data. The manufacturer then provides a different diagnostic engine 104 and systems or applications to communicate with each different handset 102 and each different diagnostic engine 104.

The present embodiment provides a plurality of different encoders 116a-116n and decoders 118a-118n, each encoder 116 and decoder 118 may be the manufacturer's proprietary systems to communicate with their specific proprietary handset 102 diagnostic engine 104. The encoders 116a-116n and decoders 118a-118n are intended to denote that any number of different encoders 116 and decoders 118 might be provided and available to promote communications with their respective proprietary diagnostic engines 104.

The encoder 116 is a device used to change data or requests into code, or signals understandable to the diagnostic engine 104, in contrast to the decoder 118, which is a device used to change code or instructions back into data understandable to the diagnostic component 114. The diagnostic computer 112 may use the appropriate encoder 116 to encode communications to the associated diagnostic engine 104, and may use the appropriate decoder 118 to decode communications from the associated diagnostic engine 104. Because these handset 102 systems are typically proprietary, attempts have been made to provide standards for these systems. For reasons of simplicity, cost, and ease of development, handset manufacturers have been reluctant to adopt standards and develop non-proprietary systems. As a result, the manufacturers would provide a proprietary custom software application or tool to interact with or obtain information from each different diagnostic engine 104.

The present disclosure provides the diagnostic component 114 which may have standardized graphical user interface (GUI) and includes a common interface, API (application programming interface) or other means to promote ready communication with a plurality of different encoders 116a-116n and decoders 118a-118n. For example, a plurality of manufacturers might provide their encoders 116 and decoders 118 capable of communication with the diagnostic component 114 based on a standard API. This allows the manufacturers to develop and keep the handset systems proprietary, while at the same time the diagnostic component 114, using or provided with a standardized API, provides a single tool and/or user interface for customer service representation to easily access and communicate with the diagnostic engines 104 of a plurality of different handsets 102. In this manner, the encoders and decoders used by the diagnostic component 114 are provided by, for example, the original equipment manufacturer (OEM) that develops the proprietary application for communicating with each of the OEM's different diagnostic engines and related handsets. This allows the OEM's system, such as the encoder, decoder, source code, that promotes communication that OEM's handset diagnostic engine to be used by the telecommunication provider, for example, without the OEM having to divulge any proprietary information.

The diagnostic computer 112 may use the knowledge base 120 to assist the user to operate the handset 102. The knowledge base 120 is a database that may include records regarding specific handset problems and specific actions that are used to assist users with each specific handset problem. Each time a handset problem is solved, its knowledge base may be updated.

The system 100 may also include a manufacturer system 122, which may include a diagnostic computer 124, which may be similar to the carrier's diagnostic computer 112. The handset 102 may also communicate indirectly with the manufacturer system 122 directly via the wireless network 108 or via the carrier system 106 and the Internet 126, or via a direct connection. The manufacturer's diagnostic computer 124 is a computer used by a handset manufacturer in a manner similar to that of the diagnostic computer 112. The manufacturer's diagnostic computer 124 may include components similar to the components in the diagnostic computer 112, such as the diagnostic component 114, the encoder 116, the decoder 118, and the knowledge base 116. It will be appreciated that the manufacturer's system 122 may only have encoders 116 and decoders 118 that correspond to their own handset. In contrast, the carrier system 106 and carrier's diagnostic computer 112 may have the encoders 116 and decoders 118 of numerous manufacturers' handsets. The handset manufacturer may also have additional or updated diagnostic information that the carrier system 106 may not have. Furthermore, the manufacturer diagnostic computer 124 may have additional capabilities to access different systems in the handset 102. Although only one manufacturer and manufacturer system 122 is shown, multiple manufacturers and their respective systems may be provided. Similar to the carrier diagnostic computer 112, the manufacturer diagnostic computer 124 may use the knowledge base 120 on the manufacturer diagnostic computer 124 to assist the user to operate the handset 102.

Figure 2:
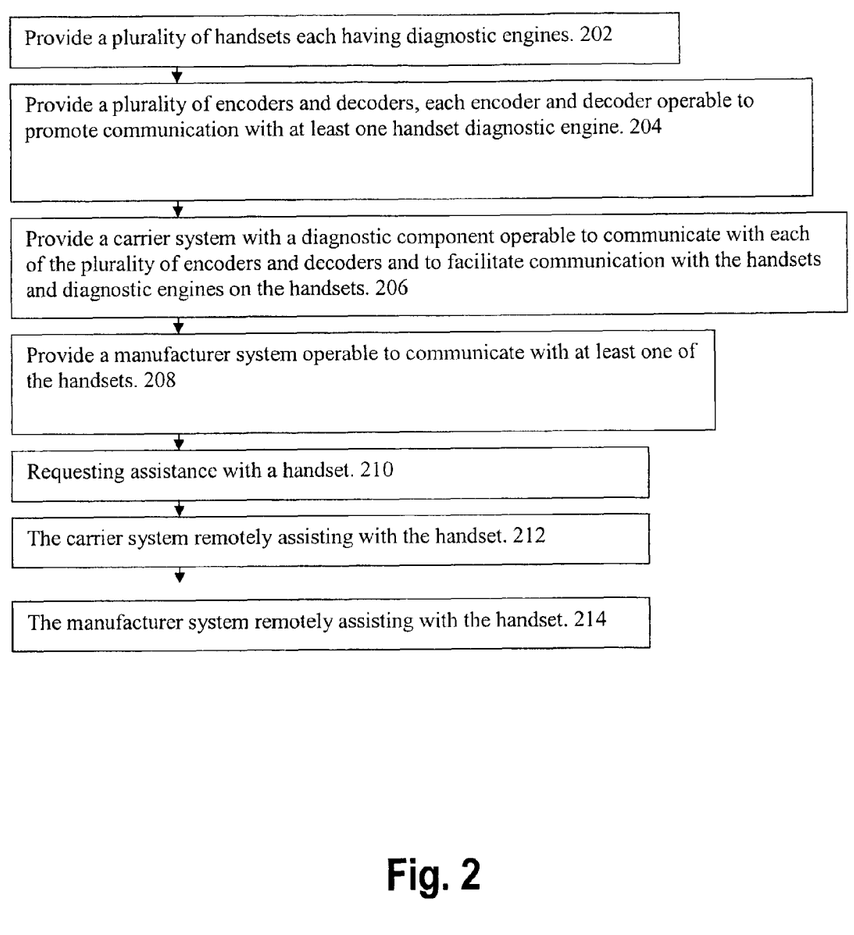
FIG. 2 shows a flow chart of a method for remote handset diagnostics according to an embodiment of the present disclosure.

Turning now to FIG. 2, a flowchart of a method for remote handset diagnostics is depicted according to an embodiment of the present disclosure. At a block 202 the method includes providing a plurality of handsets 102 each having diagnostic engines 104. At a block 204 the method includes providing a plurality of encoders and decoders 116a-116n, 118a-118n. Each encoder 116 and decoder 118 is operable to promote communication with at least one of the handset 102 diagnostic engines 104.

At a block 206 the method includes providing the carrier system 106 with the diagnostic component 114 that is operable to communicate with each of the plurality of proprietary encoders and decoders 116a-116n, 118a-118n. The diagnostic component 114 is further operable to facilitate communication with the handsets 103 and diagnostic engines 104 on the handsets 102. It should be appreciated that the diagnostic component 114 may determine to send the signal to the diagnostic engine 104 on the handset 102. Since the diagnostic engine 104 is proprietary, the diagnostic component 114 may be unable to communicate directly with the diagnostic engine 104. The diagnostic component 114 may request the encoder 116 that is associated with the diagnostic engine 104 to encode a signal or communication, or otherwise work in conjunction with the diagnostic component 114 to formulate a request for specific information to send to the diagnostic engine 104. The encoder 116 may then encode the appropriate information. In some embodiments, the diagnostic component 114 may send scripts or other information based on the encoder 116 to the diagnostic engine 104 to receive such information.

When information is returned from the diagnostic engine 104 to the carrier system 106, the diagnostic component 114 may utilize the decoder 118 to decode the information sent from the diagnostic engine 104 so that the information may be utilized and understood by the diagnostic component 114. The purpose for the communication between the carrier system 106 and the handset 102 and the diagnostic engine 104 is to assist the user with problems, whether the problems are hardware or software related, or other issues such as assistance with operating the handset 102.

At a block 208 the method includes providing the manufacturer system 122 operable to communicate with at least one of the handsets 102. The manufacturer system 122 may similarly include one or more encoders or decoders 116, 118 of the manufacturer to communicate with the diagnostic engine 104. This should be appreciated that the diagnostic capabilities of the present disclosure provide for remotely diagnosing and assisting the user with the handset in contrast to the user having to physically provide the handset to a carrier, such as at a carrier business location or to physically return the handset to a manufacturer for repair. The present system allows the carrier system 106 and/or manufacturer system 122 to communicate with the handset 102 either wirelessly via the wireless network 108, or via the Internet 126 or in other ways well known to those skilled in the art. The remote communication between the carrier and manufacturer systems 106 and 122 and the handset 102 may be initiated either by the handset 102 and/or the carrier and the manufacturer systems 106 and 122.

The method further provides for the user requesting assistance with the handset 102, at block 210. This may include the user contacting the customer service system 110, such as by calling a customer service representative. The method further provides for the carrier system 106 remotely assisting the user with the handset 212, such as using the diagnostic capabilities provided by the present disclosure. It will be appreciated, however, that the carrier system 106 may also provide for assisting the user with more common settings and other related problems in that the carrier system 106 may provide the knowledge base 120 that assists the customer service representative in resolving issues with the handset 102. Similarly, the method provides at a block 214, for the manufacturer system 122 to remotely assist the user with the handset 102 in a similar manner.

In some embodiments the diagnostic computers 112 or 124 of the carrier or manufacturer might initiate remotely diagnosing or other communication with the handset. This communication may be with or without the knowledge or assistance of the user of the handset 102. Furthermore, the carrier or manufacturer diagnostic computers 114, 124 might be operable to send software or firmware, for example, new or updated firmware or software, to the handset 102 remotely as well.

It should be appreciated that the diagnostic and other data and information collected may be stored on a storage device on the handset 102 and periodically retrieved and communicated to other systems. Alternatively, the diagnostic and other data and information might be collected from the handset 102 and then transmitted without being stored, or some data or portions of the data might be stored, temporarily or otherwise, and then transmitted to the relevant systems.

Figure 3:
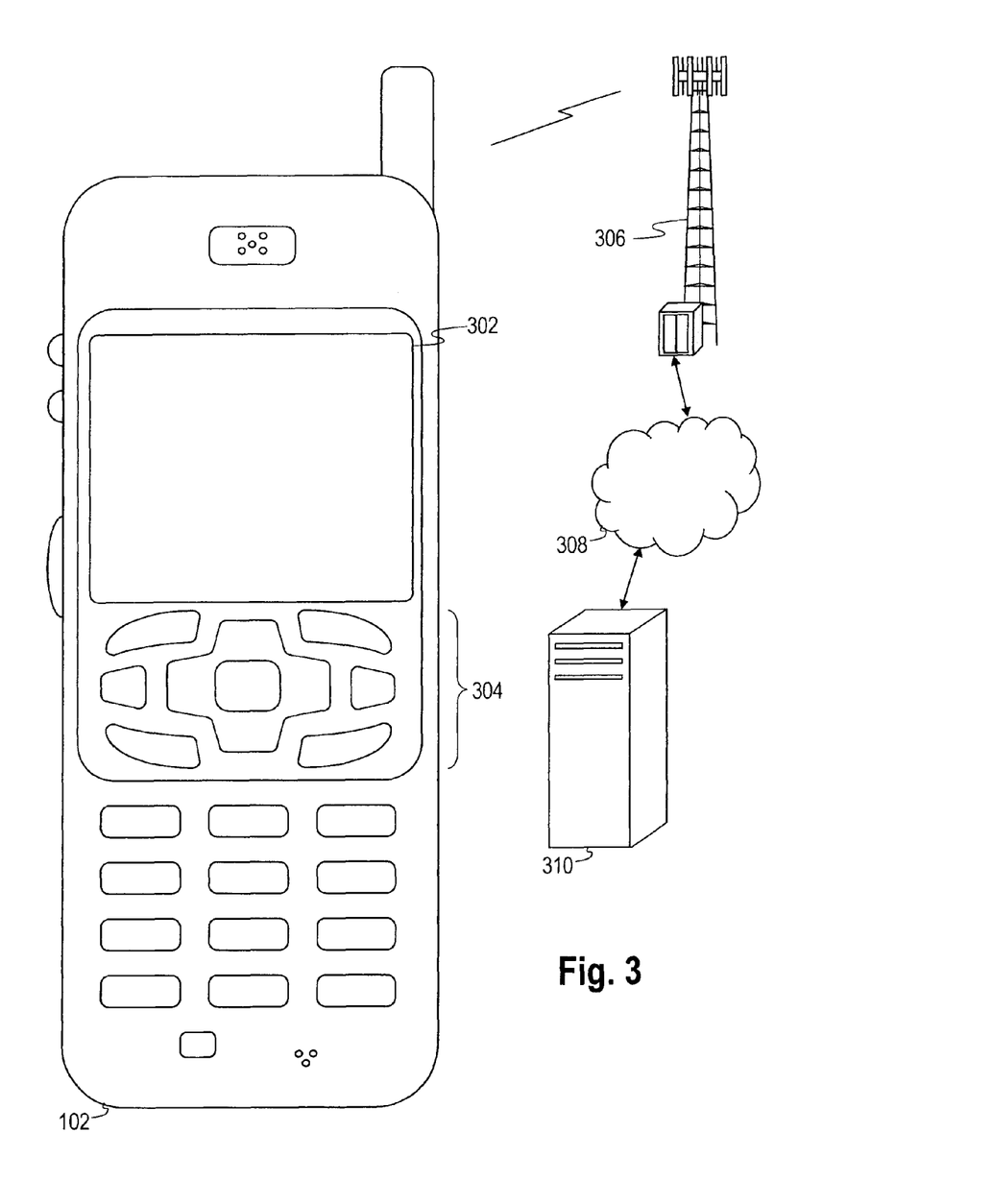
FIG. 3 shows an illustrative wireless communications system.

FIG. 3 shows a wireless communications system including the handset 102. FIG. 3 depicts the handset 102, which is operable for implementing aspects of the present disclosure, but the present disclosure should not be limited to these implementations. Though illustrated as a mobile phone, the handset 102 may take various forms including a wireless handset, a pager, a personal digital assistant (PDA), a portable computer, a tablet computer, a laptop computer, a digital camera, a digital music player, a digital calculator, and an electronic key fob for keyless entry. Many suitable handsets combine some or all of these functions. In some embodiments of the present disclosure, the handset 102 is not a general purpose computing device like a notebook or tablet computer, but rather is a special-purpose communications device such as a mobile phone, pager, or PDA.

The handset 102 includes a display 302 and a touch-sensitive surface or keys 304 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction.

Among the various applications executable by the handset 102 are a web browser, which enables the display 302 to show a web page. The web page is obtained via wireless communications with a cell tower 306, a wireless network access node, or another wireless communications network or system. The cell tower 306 (or wireless network access node) is coupled to a wired network 308, such as the Internet. Via the wireless link and the wired network, the handset 102 has access to information on various servers, such as a server 310. The server 310 may provide content that may be shown on the display 302.

Figure 4:
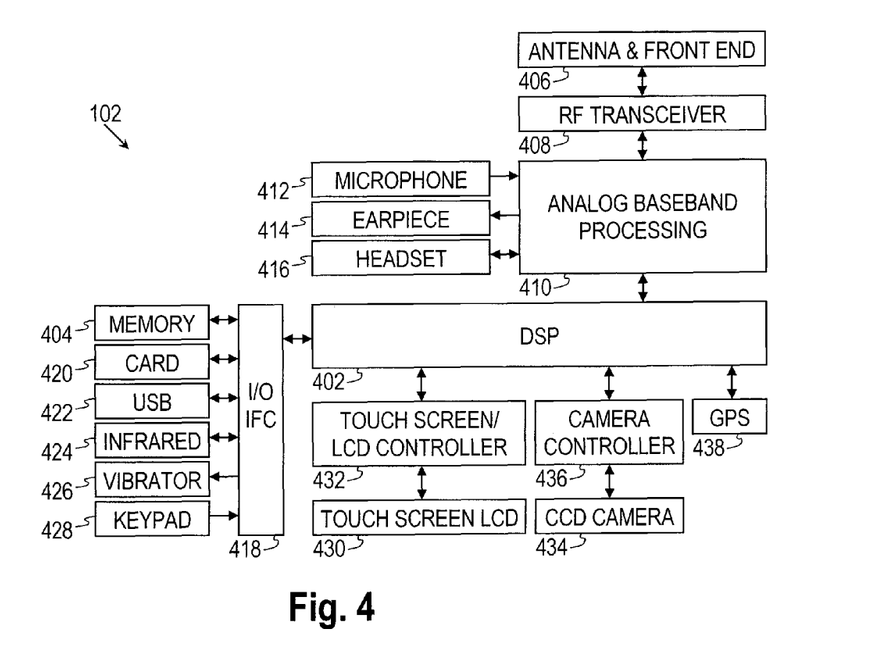
FIG. 4 shows a block diagram of an illustrative handset.

FIG. 4 shows a block diagram of the handset 102. The handset 102 includes a digital signal processor (DSP) 402 and a memory 404. As shown, the handset 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438.

The DSP 402 or some other form of controller or central processing unit operates to control the various components of the handset 102 in accordance with embedded software or firmware stored in memory 404. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 102 to send and receive information from a cellular network or some other available wireless communications network. The RF transceiver 408 provides frequency shifting, converting received RF signals to baseband and converting baseband transmit signals to RF. The analog baseband processing unit 410 may provide channel equalization and signal demodulation to extract information from received signals, may modulate information to create transmit signals, and may provide analog filtering for audio signals. To that end, the analog baseband processing unit 410 may have ports for connecting to the built-in microphone 412 and the earpiece speaker 414 that enable the handset 102 to be used as a cell phone. The analog baseband processing unit 410 may further include a port for connecting to a headset or other hands-free microphone and speaker configuration.

The DSP 402 may send and receive digital communications with a wireless network via the analog baseband processing unit 410. In some embodiments, these digital communications may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the infrared port 424. The USB interface 422 may enable the handset 102 to function as a peripheral device to exchange information with a personal computer or other computer system. The infrared port 424 and other optional ports such as a Bluetooth interface or an IEEE 802.11 compliant wireless interface may enable the handset 102 to communicate wirelessly with other nearby handsets and/or wireless base stations.

The input/output interface 418 may further connect the DSP 402 to the vibrator 426 that, when triggered, causes the handset 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the handset 102. Another input mechanism may be the touch screen LCD 430, which may also display text and/or graphics to the user. The touch screen LCD controller 432 couples the DSP 402 to the touch screen LCD 430.

The CCD camera 434 enables the handset 102 to take digital pictures. The DSP 402 communicates with the CCD camera 434 via the camera controller 436. The GPS sensor 438 is coupled to the DSP 402 to decode global positioning system signals, thereby enabling the handset 102 to determine its position. Various other peripherals may also be included to provide additional functions, e.g., radio and television reception.

Figure 5:
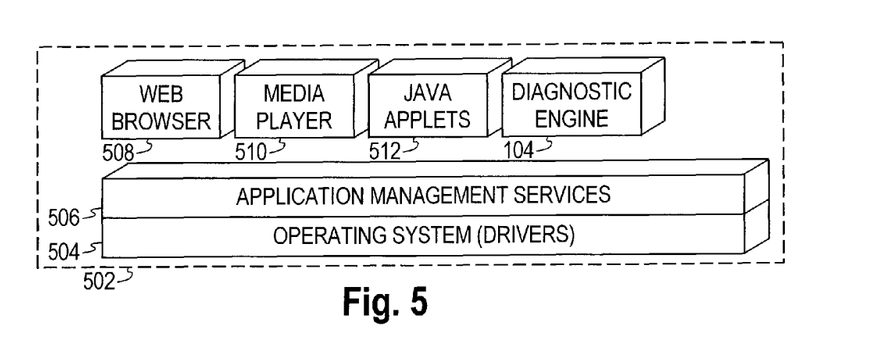
FIG. 5 shows a diagram of an illustrative software configuration for a handset.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 102. Also shown in FIG. 5 are a web browser application 508, a media player application 510, Java applets 512, and the diagnostic engine 104. The web browser application 508 configures the handset 102 to operate as a web browser, allowing a user to enter information into forms and select links to retrieve and view web pages. The media player application 510 configures the handset 102 to retrieve and play audio or audiovisual media. The Java applets 512 configure the handset 102 to provide games, utilities, and other functionality. The diagnostic engine 104 is a component that may generate or record information related to the operation of the handset 102.

Figure 6:
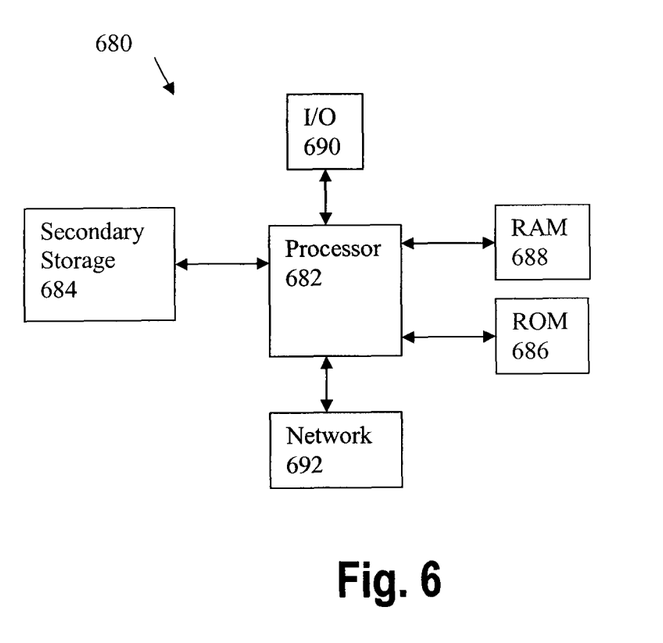
FIG. 6 shows an illustrative general purpose computer system suitable for implementing the several embodiments of the disclosure.

One or more applications or systems described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for remote handset diagnostics comprising:
   transmitting, in response to a first request from a carrier diagnostic computer, first diagnostic data from a handset diagnostic engine to the carrier diagnostic computer, the first diagnostic data proprietary to a specified manufacturer of the handset associated with the handset diagnostic engine;
   receiving first information that is configured to assist a user of the handset to operate the handset, the first information transmitted by the carrier diagnostic computer in response to the first diagnostic data obtained from the handset;
   transmitting, in response to a second request from the carrier diagnostic computer, second diagnostic data from the handset diagnostic engine to a manufacturer diagnostic computer; and
   receiving second information that is configured to assist the user of the handset to operate the handset, the second information transmitted by the manufacturer in response to the second diagnostic data obtained from the handset.

2. The method of claim 1, wherein receiving second information that is configured to assist the user of the handset to operate the handset comprises receiving second information that is configured to assist the user with handset problems.

3. The method of claim 1, wherein the first request is generated by encoding the first request for the first diagnostic data to the handset diagnostic engine and decoding the first diagnostic data received from the handset diagnostic engine, and
   wherein the second request is generated by encoding the second request for the second diagnostic data to the handset diagnostic engine and decoding the second diagnostic data received from the handset diagnostic engine.

4. The method of claim 1, wherein the handset comprises at least one of a mobile phone, a wireless handset, a pager, a personal digital assistant, a portable computer, a tablet computer, a laptop computer, a digital camera, a digital music player, a digital calculator, and an electronic key fob for keyless entry.

5. The method of claim 1, wherein the first diagnostic data and the second diagnostic data comprise handset system parameters including dropped calls information and error logs which are inaccessible to the user of the handset.

6. The method of claim 1, further comprising:
   accessing, by the handset diagnostic engine, a carrier knowledge base to obtain third information related to the handset, the third information configured to promote assisting the user of the handset to operate the handset, the third information obtained based on the obtained first diagnostic data; and
   accessing, by the handset diagnostic engine, a manufacturer knowledge base to obtain fourth information related to the handset, the fourth information configured to promote assisting the user of the handset to operate the handset, the fourth information obtained based on the obtained second diagnostic data.

7. A remote handset diagnostics system comprising a plurality of handsets, at least some of the handsets provided by a plurality of different manufacturers, each handset comprising a handset diagnostic engine, at least some of the different manufacturers having different handset diagnostic engines, the system comprising:
  a telecommunications carrier system including a carrier diagnostic component for one or more of the plurality of different handset diagnostic engines, the carrier diagnostic component configured to:
    obtain, in response to a first request from the carrier diagnostic component, first diagnostic data from the corresponding handset diagnostic engine; and
    remotely diagnose the handset associated with the corresponding handset diagnostic engine in response to the obtained first diagnostic data, the first diagnostic data configured to be proprietary to one manufacturer of one handset associated with the handset diagnostic engine,
  wherein the handset diagnostic engine is configured to transmit, in response to a second request from the carrier diagnostic component, second diagnostic data from the corresponding handset diagnostic engine to a manufacturer system including a manufacturer diagnostic component, the manufacturer system configured to remotely diagnose the handset in response to the transmitted second diagnostic data.

8. The system of claim 7, wherein the telecommunications carrier system and manufacturer system are configured to remotely obtain the first and second diagnostic data, respectively, from the corresponding handset diagnostic engine.

9. The system of claim 7, further comprising an encoder and a decoder configured to promote communication between each carrier diagnostic component and the corresponding handset diagnostic engine.

10. The system of claim 7, wherein the carrier diagnostic component includes a user interface configured to be used by a customer service representative of the telecommunications carrier to promote diagnosing handsets having different diagnostic engines.

11. The system of claim 7, wherein each handset comprises at least one of a mobile phone, a wireless handset, a pager, a personal digital assistant, a portable computer, a tablet computer, a laptop computer, a digital camera, a digital music player, a digital calculator, and an electronic key fob for keyless entry.

12. The system of claim 7, wherein the first diagnostic data and the second diagnostic data comprise handset system parameters including dropped calls information and error logs which are inaccessible to the user of the handset.

13. The system of claim 7, wherein each carrier diagnostic component is further configured to access settings information and a carrier knowledge base to obtain information related to the corresponding handset to assist the user of the handset to operate the handset.

14. A handset comprising:
  a handset diagnostic engine configured to:
    transmit, in response to a first request from a carrier diagnostic computer, first diagnostic data from a handset diagnostic engine to the carrier diagnostic computer, the first diagnostic data proprietary to a specified manufacturer of the handset associated with the handset diagnostic engine;
    receive first information that is configured to assist a user of the handset to operate the handset, the first information transmitted by the carrier diagnostic computer in response to the first diagnostic data obtained from the handset;
    transmit, in response to a second request from the carrier diagnostic computer, second diagnostic data from the handset diagnostic engine to a manufacturer diagnostic computer; and
    receive second information that is configured to assist the user of the handset to operate the handset, the second information transmitted by the manufacturer in response to the second diagnostic data obtained from the handset.

15. The handset of claim 14, wherein the telecommunications carrier system and manufacturer system are configured to remotely obtain the first and second diagnostic data, respectively, from the corresponding handset diagnostic engine.

16. The handset of claim 14, wherein the carrier diagnostic computer comprises an encoder and a decoder configured to promote communication between each carrier diagnostic component and the corresponding handset diagnostic engine.

17. The handset of claim 14, wherein the carrier diagnostic component includes a user interface configured to be used by a customer service representative of the telecommunications carrier to promote diagnosing handsets having different diagnostic engines.

18. The handset of claim 14, wherein each handset comprises at least one of a mobile phone, a wireless handset, a pager, a personal digital assistant, a portable computer, a tablet computer, a laptop computer, a digital camera, a digital music player, a digital calculator, and an electronic key fob for keyless entry.

19. The handset of claim 14, wherein the first diagnostic data and the second diagnostic data comprise handset system parameters including dropped calls information and error logs which are inaccessible to the user of the handset.

20. The handset of claim 14, wherein each carrier diagnostic component is further configured to access settings information and a carrier knowledge base to obtain information related to the corresponding handset to assist the user of the handset to operate the handset.

* * * * *